United States Patent
Welich et al.

[11] Patent Number: 5,437,919
[45] Date of Patent: Aug. 1, 1995

[54] LINING PART FOR MOTOR VEHICLES AND A METHOD FOR THE MANUFACTURE THEREOF

[75] Inventors: Sven Welich, Lenggries; Gunther Feist, Rosenheim; Rainer Gardill, Reichersbeuern, all of Germany

[73] Assignee: Empe-Werke Ernst Pelz GmbH & Co., KG, Geretsried, Germany

[21] Appl. No.: 202,431

[22] Filed: Feb. 28, 1994

[30] Foreign Application Priority Data

Jun. 25, 1993 [DE] Germany .............. 43 21 225.5

[51] Int. Cl.[6] .............. B32B 7/00; B29C 47/00; B60J 7/00
[52] U.S. Cl. .............. 428/245; 428/175; 428/246; 428/260; 428/284; 428/289; 428/316.6; 428/317.5; 428/317.7; 428/318.4; 428/542.2; 296/214; 156/196; 156/228; 156/242; 156/330
[58] Field of Search .............. 428/174, 178, 304.4, 428/182, 542.2, 71, 72, 158, 175, 182, 245, 246, 260, 284, 289, 316.6, 317.5, 317.7, 318.4; 156/196, 228, 242, 297, 330; 296/214

[56] References Cited

U.S. PATENT DOCUMENTS

| | | | |
|---|---|---|---|
| 4,348,450 | 9/1982 | Shaw | 428/182 |
| 4,933,225 | 6/1990 | Abe | 428/157 |
| 4,935,281 | 6/1990 | Tolbert et al. | 428/116 |
| 5,139,838 | 8/1992 | Baume | 428/72 |

FOREIGN PATENT DOCUMENTS 7916899 11/1979 Germany .
2831640 3/1980 Germany .

OTHER PUBLICATIONS

Kunststoff–Lexikon, Carl Hanser Verlag Munchen Wien 1983 (Encyclopedia of Plastics).

*Primary Examiner*—Donald J. Loney
*Attorney, Agent, or Firm*—Hill, Steadman & Simpson

[57] ABSTRACT

A planar lining part for motor vehicles, and a method of manufacture thereof, such as motor vehicle inside roof linings or the like, comprising a one-ply or multi-ply core layer and two outside layers of natural fiber fleece covering said core layer which are connected to the core layer by respective adhesive layers. The adhesive layers are composed of foamed epoxy resin and the outside layers are composed of loosely woven material.

15 Claims, 1 Drawing Sheet

LINING PART FOR MOTOR VEHICLES AND A METHOD FOR THE MANUFACTURE THEREOF

BACKGROUND OF THE INVENTION

The invention is directed to a generally planar lining part for motor vehicles, such as inside roof linings of motor vehicles or the like, comprising a one-ply or multi-ply core layer and two outside layers of natural fiber fleece covering the core layer, each of which is connected to the core layer by a respective adhesive layer. The invention is also directed to a method for manufacturing a planar lining part for motor vehicles such as inside roof linings of motor vehicles or the like.

Lining parts in the form of inside roof linings for motor vehicles of the type set forth above are known, wherein the core layer is composed of polyurethane foam, whereas the outside layers are composed of glass fleeces, or respectively, fiberglass layers. The fiberglass layers are thereby glued to the outside surfaces of the core layer with polyurethane adhesive or thermal glue. Polyester fleeces or paper fleeces are thereby employed as cover layers, these preventing a sticking of the outside layers to the shaping tool and representing a protective covering for the glass fleeces employed as outside layer.

Waste disposal problems occur given these known lining parts since fiberglass fleeces cannot be recycled or, respectively, can only be recycled after a complicated separation of materials.

Lining parts of the species are also known wherein the outside layers are composed of mechanically reinforced, woven jute fiber fleeces. A decorative layer can thereby be provided which is laminated in a separate working cycle or applied in a single step in the manufacture of the core layer instead of applying an outer fleece. In the known lining part, the jute fleeces are mechanically reinforced and are glued to the core layer with the adhesive layers composed of polyurethane adhesive.

Adequate strength under climatic stresses cannot be produced with this design. On the contrary, the lining part sags to an unacceptable extent particularly when designed as a self-supporting inside roof lining under climatic stress in a humid and/or warm climate.

SUMMARY OF THE INVENTION

The object of the invention is to create a lining part for inside roof linings for motor vehicles that provides adequate shape stability even under climatic demands and allows for complete recyclability.

This object is inventively achieved in that a core is provided having outside layers connected thereto by adhesive layers wherein the adhesive layers are composed of foamed epoxy resin; and in that the outside layers are exclusively composed of loosely woven material.

At least one of the outside layers can be composed of natural fiber fleece. At least one of the outside layers can comprise flax fiber fleece. At least one of the outside layers can comprise jute fiber fleece. At least one of the outside layers can comprise sisal fiber fleece.

According to the invention, at least one of the outside layers can be covered with a cover layer at its side facing away from the core layer. At least one of the cover layers can be composed of polyester fleece. At least one of the cover layers can be composed of paper fleece. The invention also provides that the cover layer or layers can be glued to the respective outside layer with a foamed epoxy resin.

A further embodiment of the invention provides an external decorative layer facing toward the viewed side.

The core layer can be composed of polyurethane foam. The core layer can be composed of corrugated cardboard.

Another object of the invention is to provide a method for manufacturing an inside roof lining for a motor vehicle whereby a respective adhesive layer as well as a respective outside layer of natural fiber fleece adjoining thereat are arranged at both sides of a core layer and the entire layer structure is joined together upon application of pressure and heat in a heated shaping tool or the like.

The method of the invention can provide that the adhesive layers are formed by spraying on a foaming epoxy resin, this saturating the outside layers when foamed in the shaping tool. The epoxy resin can be sprayed onto the core layer. The epoxy resin can be sprayed onto that side of the outside layers facing toward the core layer.

A further embodiment of the method provides that the cover layers can be saturated with epoxy resin.

The invention is based on the surprising perception that a lining part of completely recyclable material can be created that is also stable in shape under climatic stress in that the adhesive layers are fashioned of foamable epoxy resin, whereby the natural fiber fleeces are preferably sprayed with the foamable epoxy resin at that side facing toward the core layer. In addition to the gluing of the outside layers to the core layer, a good saturation of the outside layers also ensues when this composite is cured in a heated shaping tool. This saturation, given simultaneous waiver of a chemical or thermal solidification of the outside layers, is indispensable for climate-proofing.

Surprisingly, excellent climate-proofing can be achieved not only where the core layer is composed of polyurethane foam, but also when a core layer of simple corrugated cardboard is employed. The strength of the corrugated cardboard is preserved to an adequate extent even in a humid climate, whereby the quantity of epoxy resin employed can be reduced to such an extent that the part can be considered to be a fully recyclable lining part.

In order to improve the ejectability, thin polyester fleeces or paper fleeces can be placed as cover layers over the natural fiber fleece of the outside layers, these cover layers being co-bonded at the same time by the foaming epoxy resin which comprises the adhesive layers. The cover layers simultaneously enhance the stiffness, whereby this, however, is not absolutely necessary. Coated or uncoated materials can be utilized as paper fleeces.

Further features and advantages of the invention derive from the following description wherein exemplary embodiments are set forth in detail with reference to the schematic drawing.

DETAILED DESCRIPTION OF THE PREFERRED EMBODIMENTS

Figure 1:
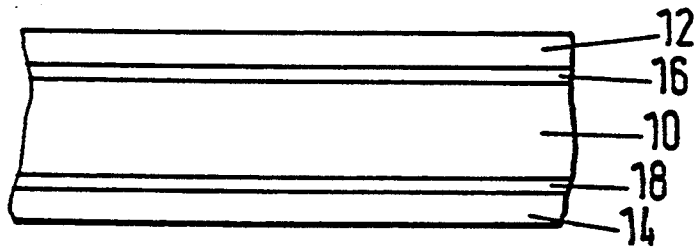
FIG. 1 is a first exemplary embodiment of a lining part of the invention in a section perpendicular to the generally planar extent thereof.

In the exemplary embodiment of FIG. 1, a core layer 10 of polyurethane foam such as medium hard foam, obtainable from the Reissgies Company, density 33 kg/m$^3$, is connected at both sides to outside layers 12, 14 via adhesive layers 16, 18. The outside layers 12, 14 are composed of flax fiber fleece, having a dry weight of 150 g/m$^2$, whereas the adhesive layers 16, 18 are formed by foaming epoxy resin having a dry weight of 160 g/m$^2$, obtainable from the Ciba-Geigy Company, upon employment of resin such as type LMW 1135, as well as hardener such as type HY 5003.

Figure 2:
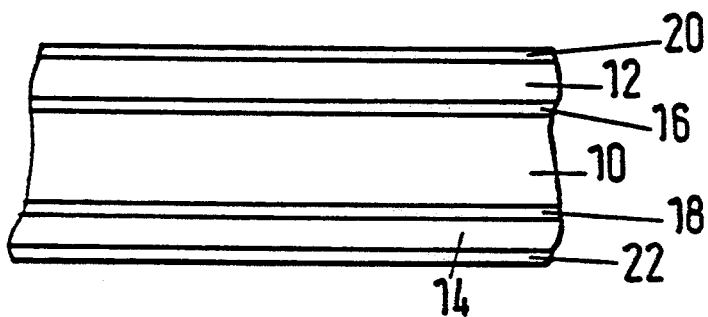
FIG. 2 is a second embodiment of a lining part of the invention shown in a fashion corresponding to FIG. 1.

The exemplary embodiment of FIG. 2 corresponds to that of FIG. 1, whereby the outside layers 12, 14, however, are covered by polyester fleeces having a dry weight of 50 g/m$^2$, chemically bonded, obtainable from Textilgruppe Hof. The cover layers 20, 22 of polyester fleece facilitate the ejection of the overall layer composite from the shaping tool.

Figure 3:
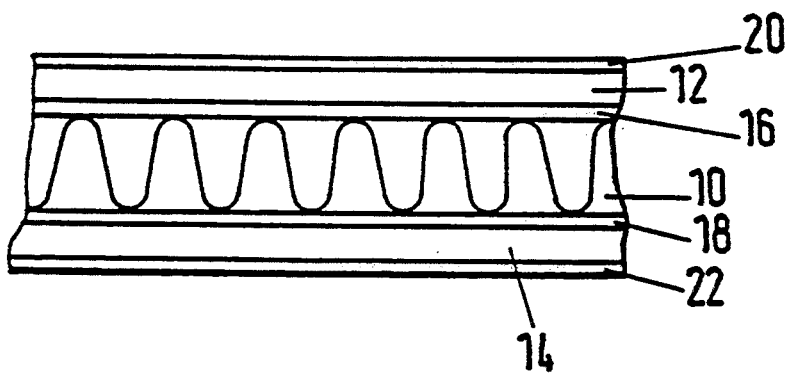
FIG. 3 is a third embodiment of a lining part of the invention shown in a fashion corresponding to FIGS. 1 and 2.

In the exemplary embodiment of FIG. 3, the core layer 10 is composed of corrugated cardboard having a ridge height of 5 through 7 mm and a basis weight of 425 g/m$^2$. The adhesive layer 16, 18 are composed of 100 g/m$^2$ epoxy resin obtainable from Ciba-Geigy having the resin and hardener such as described for the exemplary embodiments of FIG. 1 and of FIG. 2. The remaining layer structure is unmodified in comparison to the exemplary embodiment of FIG. 2.

In the manufacture of the above-described exemplary embodiments according to FIG. 1 through 3, the epoxy resin is applied by spraying onto that side of the outside layers 12, 14 facing toward the core layer 10. However, it is also possible to spray the core layer 10 itself with epoxy resin on both surfaces.

The core layer 10 and outside layers 12, 14 are arranged together and the adhesive layers 16, 18 are sprayed therebetween onto either the core layer or the respective outside layers. The adhesive layers are formed by foaming in a heated shaping tool. Pressure and heat in the shaping tool integrates the three parts, the adhesive saturating the outside layers.

The preferred quantities utilized are polyester fleeces having a basis weight of 30 through 150 g/m$^2$, preferably 50 through 70 g/m$^2$ for the cover layers 20, 22, and flax or jute fiber fleeces having a basis weight (dry) of 100 through 300 g/m$^2$, preferably 100 through 200 g/m$^2$, for the outside layers 12, 14.

When corrugated cardboard is not employed, polyurethane foam having a volume weight of 20 through 60 kg/m$^3$, preferably 25 through 35 kg/m$^3$, is preferably employed as material for the core layer. The epoxy foam for the adhesive layers 16, 18 is preferably set at 60 through 300 g/m$^2$, particularly at 120 through 180 g/m$^2$ insofar as the core layer 10 is composed of polyurethane foam, and set at 80 through 150 g/m$^2$ when the core layer 10 is composed of corrugated cardboard.

When paper fleeces are employed for the cover layers 20, 22 instead of polyester fleeces, a basis weight of 90 g/m$^2$ is advantageous.

Although the present invention has been described with reference to a specific embodiment, those of skill in the art will recognize that changes may be made thereto without departing from the scope and spirit of the invention as set forth in the appended claims.

We claim as our invention:

1. A lining part for motor vehicles, comprising:
   a core layer;
   first and second outside layers of natural fiber fleece covering said core layer on opposite sides thereof, first and second adhesive layers respectively connecting said outside layers to the core layer, said first and second adhesive layers containing foamed epoxy resin; and
   said first and second outside layers containing loosely woven material.

2. The lining part according to claim 1, wherein at least one of the first and second outside layers comprises flax fiber fleece.

3. The lining part according to claim 1, wherein at least one of the first and second outside layers is composed of jute fiber fleece.

4. The lining part according to claim 1, wherein at least one of the first and second outside layers comprises sisal fiber fleece.

5. The lining part according to claim 1 further comprising a cover layer, wherein at least one of the first and second outside layers has its side facing away from the core layer covered with the cover layer.

6. The lining part according to claim 5, wherein the cover layer is composed of polyester fleece.

7. The lining part according to claim 5, wherein the cover layer is composed of paper fleece.

8. The lining part according to claim 5, wherein the cover layer is glued to the respective first or second outside layer with a foamed epoxy resin.

9. The lining part according to claim 1 further comprising an outer decorative layer covering the first outside layer facing toward the viewed side.

10. The lining part according to claim 1, wherein the core layer is composed of polyurethane foam.

11. The lining part according to claim 1, wherein the core layer is composed of corrugated cardboard.

12. A method for manufacturing a lining part for motor vehicles, comprising the steps of:
    arranging on opposite sides of a core layer a respective outside layer of natural fiber fleece to be respectively adjoining thereat;
    forming adhesive layers by spraying a foaming epoxy resin between the core and the outside layers on which saturates the outside layers when foamed in a heated shaping tool;
    joining together the entire layer structure by applying pressure and heat in the heated shaping tool.

13. The method according to claim 12, wherein the step of spraying is further characterized in that the epoxy resin is sprayed onto the core layer.

14. The method according to claim 12, wherein the step of spraying is further characterized in that the epoxy resin is sprayed onto the side of the outside layers facing toward the core layer.

15. The method according to claim 12 comprising the further step of providing cover layers of fleece material covering the outside layers, and saturating the cover layers with epoxy resin and securing each cover layer to a respective outside layer.

* * * * *